United States Patent
Irish et al.

(10) Patent No.: US 8,483,961 B2
(45) Date of Patent: Jul. 9, 2013

(54) SYSTEMS, METHODS, AND COMPUTER PROGRAM PRODUCTS OF FLIGHT VALIDATION

(75) Inventors: Jeremy Patrick Irish, Edmond, OK (US); Steve Patrick Chase, Ashburn, VA (US); Adric Eckstein, Oakton, VA (US); Timothy Lovell, Blanchard, OK (US)

(73) Assignee: The MITRE Corporation, McLean, VA (US)

( * ) Notice: Subject to any disclaimer, the term of this patent is extended or adjusted under 35 U.S.C. 154(b) by 262 days.

(21) Appl. No.: 12/871,645

(22) Filed: Aug. 30, 2010

(65) Prior Publication Data

US 2012/0053832 A1    Mar. 1, 2012

(51) Int. Cl.
*G01S 13/88*    (2006.01)
(52) U.S. Cl.
USPC ............................ 701/519; 701/523; 701/514
(58) Field of Classification Search
USPC ....... 702/5; 701/468, 523, 519, 514; 248/135, 248/140, E7.08
See application file for complete search history.

(56) References Cited

U.S. PATENT DOCUMENTS

| | | | |
|---|---|---|---|
| 7,715,978 B1 * | 5/2010 | Wenger et al. | 701/448 |
| 2010/0097460 A1 * | 4/2010 | Abernathy | 348/140 |
| 2010/0283853 A1 * | 11/2010 | Acree | 348/144 |
| 2010/0318330 A1 * | 12/2010 | Toms | 703/2 |

* cited by examiner

*Primary Examiner* — Patrick Cicchino
(74) *Attorney, Agent, or Firm* — Sterne, Kessler, Goldstein & Fox, P.L.L.C.

(57) ABSTRACT

Systems, methods, and computer program products for flight validation (FV) are provided. Embodiments implement the requirements of FAA Notice 8260.67 as they relate to FV. Embodiments enable FV to be performed in its entirety, including flight and/or ground obstacle assessment, and on-course/on-path flight evaluation. Embodiments enable a post-flight validation phase, which provides post flight analysis and archiving capabilities. Using embodiments, a person of minimal skill and training can perform FV as prescribed by FAA requirements. Accordingly, significant costs associated with hiring professional surveyors and air crews to perform obstacle assessment and flight evaluation can be eliminated. Embodiments can be implemented using commercial off-the-shelf (COTS) and relatively inexpensive hardware, making them suitable for large-scale FV operations. Embodiments may also be integrated with existing instrument flight procedure design tools, including, for example, the TARGETS (Terminal Area Route Generation Evaluation & Traffic Simulation) tool developed by the MITRE Corporation.

27 Claims, 11 Drawing Sheets

SYSTEMS, METHODS, AND COMPUTER PROGRAM PRODUCTS OF FLIGHT VALIDATION

Statement under MPEP 310. The U.S. government has a paid-up license in this invention and the right in limited circumstances to require the patent owner to license others on reasonable terms as provided for by the terms of Contract No. DTFA01-01-C-00001, awarded by the Federal Aviation Agency (FAA).

FIELD OF THE INVENTION

The present invention relates generally to flight validation (FV).

BACKGROUND OF THE INVENTION

Federal Aviation Administration (FAA) Notice 8260.67 establishes guidance for Performance-Based Navigation (PBN) Instrument Flight Procedure (IFP) validation. In particular, FAA Notice 8260.67 supplements FAA Order 8200.1 by adding a flight validation (FV) requirement to be performed prior to procedure implementation. FV includes an airborne and a ground assessment phase. The ground assessment includes an obstacle assessment which may be completed from the ground or from an aircraft. This assessment is required to accurately assess existing, new or inaccurate obstacles identified during obstacle assessment, as well as a flight validation phase.

Ground obstacle surveying is traditionally performed by specialized surveying companies in accordance with existing FAA regulations. The expense and time required for such surveys hinders their feasibility for the obstacle assessment phase of FV.

Accordingly, alternative, low-cost obstacle assessment/surveying approaches are needed.

BRIEF SUMMARY OF THE INVENTION

System, method, and computer program product embodiments for flight validation (FV) are provided. Embodiments of the present invention implement the requirements of FAA Notice 8260.67 as they relate to FV. In particular, embodiments enable FV to be performed in its entirety, including flight and/or ground obstacle assessment, and on-course/on-path flight evaluation. In addition, embodiments enable a post-flight validation phase, which provides post flight analysis and archiving capabilities. Using embodiments of the present invention, a person of minimal skill and training can perform FV as prescribed by FAA requirements. Accordingly, significant costs associated with hiring professional surveyors and aircrews to perform obstacle assessment and flight evaluation are eliminated. Furthermore, embodiments are implemented using commercial off-the-shelf (COTS) and inexpensive hardware, making them suitable for large-scale FV operations. Embodiments of the present invention may also be integrated with existing instrument flight procedure design tools, including, for example, the TARGETS (Terminal Area Route Generation Evaluation & Traffic Simulation) tool developed by the MITRE Corporation.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

PBN IFP Validation

FAA Notice 8260.67 establishes guidance for Performance-Based Navigation (PBN) Instrument Flight Procedure (IFP) validation. In particular, FAA Notice 8260.67 supplements FAA Order 8200.1 by adding a flight validation (FV) requirement to be performed prior to procedure implementation. FV has several objectives, which include ensuring adequate obstacle clearance in instrument flight procedures; verifying correct charting and coded navigation data; performing flyability assessment (actual or simulated); verifying that all required infrastructure (e.g., runway markings, lighting, and communications) are in place and operative; and evaluating and documenting other operational areas such as human factors, charting issues, visibility, etc.

Embodiments of the present invention, as will be further discussed below, implement the requirements of FAA Notice 8260.67 as they relate to FV. In particular, embodiments enable FV to be performed in its entirety, including flight and/or ground obstacle assessment, and on-course/on-path flight evaluation. In addition, embodiments enable a post-flight validation phase, which provides post flight analysis and archiving capabilities. Using embodiments of the present invention, a person of minimal skill and training can perform FV as prescribed by FAA requirements. Accordingly, significant costs associated with hiring professional surveyors and aircrews to perform obstacle assessment and flight evaluation are eliminated. Furthermore, embodiments are implemented using commercial off-the-shelf (COTS) and inexpensive hardware, making them suitable for large-scale FV operations. Embodiments of the present invention may also be integrated with existing instrument flight procedure design tools, including, for example, the TARGETS (Terminal Area Route Generation Evaluation & Traffic Simulation) tool developed by the MITRE Corporation.

Figure 1:
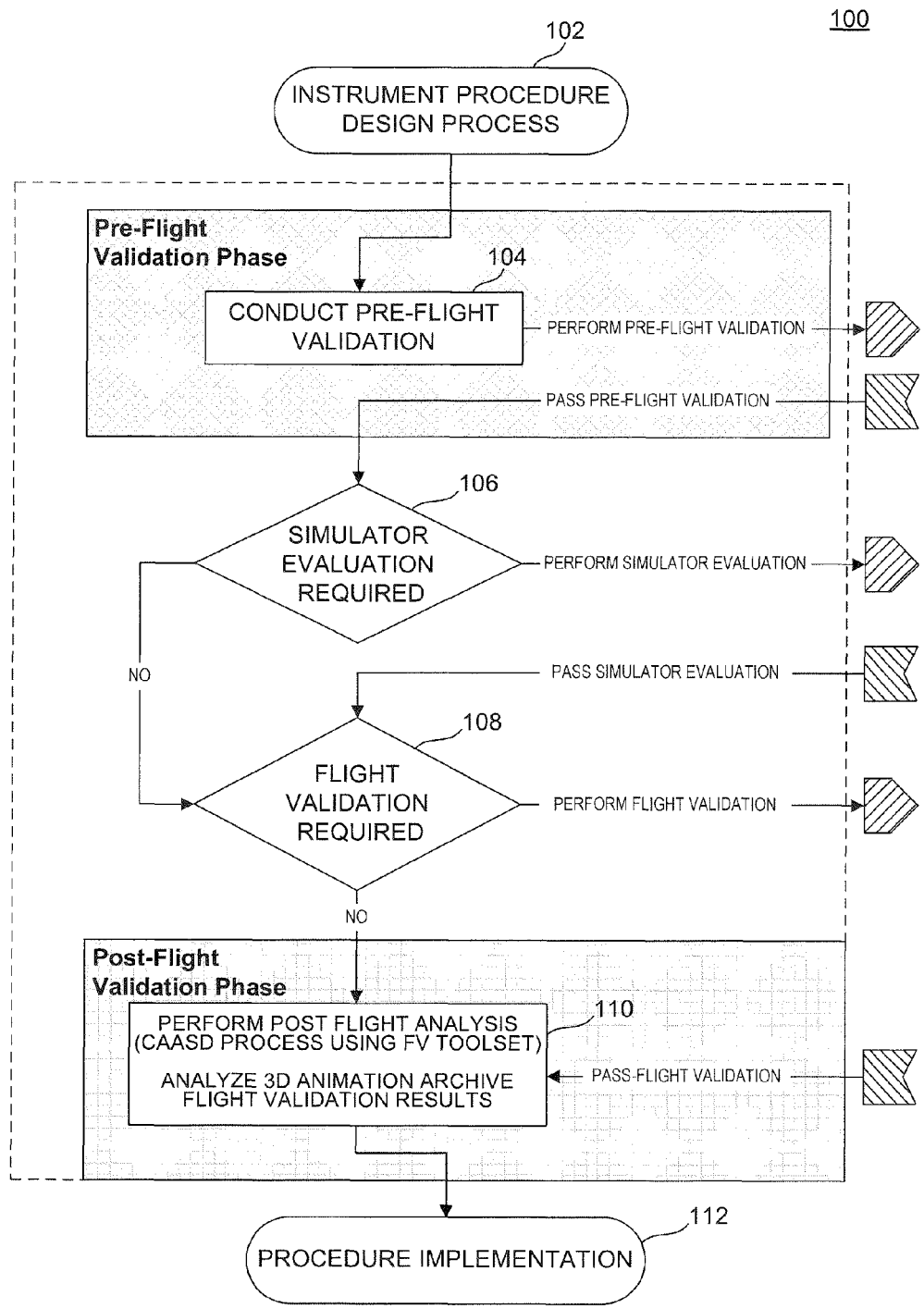
FIG. 1 illustrates an example process that implements Performance-Based Navigation (PBN) Instrument Flight Procedure (IFP) design, validation, and implementation as prescribed by FAA Notice 8260.67, according to an embodiment of the present invention.

FIG. 1 illustrates an example process 100 that implements Performance-Based Navigation (PBN) Instrument Flight Procedure (IFP) design, validation, and implementation as prescribed by FAA (Federal Aviation Agency) Notice 8260.67, according to an embodiment of the present invention.

As shown in FIG. 1, example process 100 begins in step 102, which includes the instrument flight procedure design process. In step 102, computerized design tools (e.g., TARGETS) and/or manual design procedures are used to design an instrument flight procedure (e.g., approach, takeoff, enroute, etc.). Subsequently, validation of the instrument flight procedure is performed. According to FAA requirements, PBN IFP validation includes both ground validation (GV) and flight validation (FV).

Figure 2:
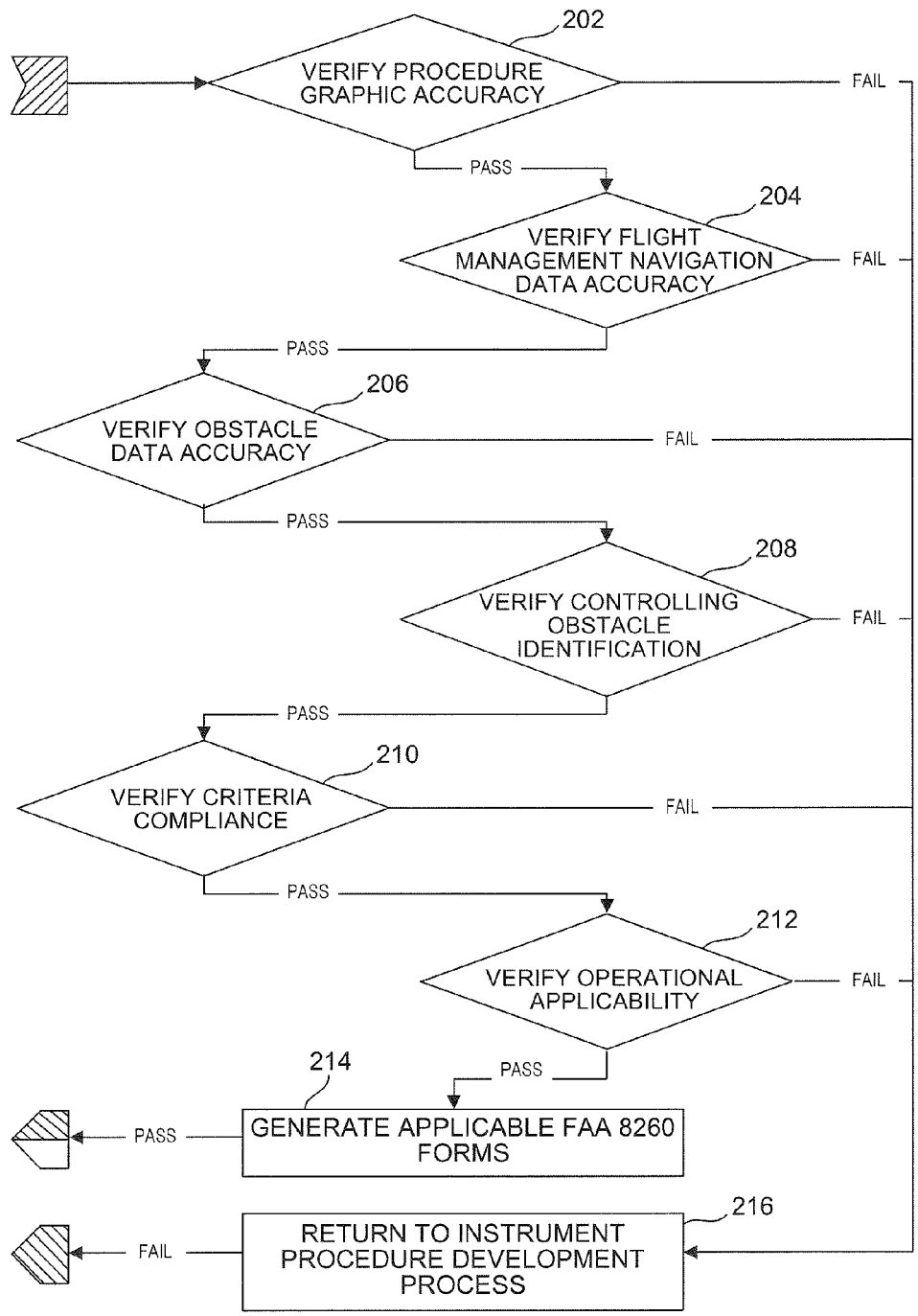
FIG. 2 illustrates an example pre-flight validation process according to an embodiment of the present invention.

In process flowchart 100, FV is implemented via steps 104 and 106. In particular, in step 104, pre-flight validation is performed. Pre-flight validation includes a review of the entire instrument flight procedure by a person trained in procedure design. FIG. 2 illustrates an example pre-flight validation process 200 according to an embodiment of the present invention. As shown in FIG. 2, example process 200 begins in step 202, which includes verifying procedure graphic accuracy. Subsequently, step 204 includes verifying flight management navigation data accuracy; step 206 includes verifying obstacle data accuracy; step 208 includes verifying controlling obstacle identification; step 210 includes verifying criteria compliance; step 212 includes verifying operational applicability; and finally step 214 includes generating applicable FAA 8260 fauns. If at any point in process 200, a verification step is failed, process 200 proceeds to step 216, which includes returning to the instrument flight procedure design process. Returning to FIG. 1, if pre-flight validation is successful, process 100 proceeds to step 106. If not, process 100 returns to step 102 to address any issues identified in step 104.

When required, in step 106, a simulator evaluation of the instrument flight procedure is performed. Simulator evaluation represents another check on the instrument flight procedure prior to FV. Simulator evaluation is typically conducted in an appropriately equipped Category 3 flight simulator, which provides a simulated flight of the instrument flight procedure using various conditions (e.g., max temperature, winds, etc). Under certain circumstances flight simulator data can be analyzed using the TARGETS program. If simulator evaluation is successful, process 100 proceeds to the FV phase of PBN IFP validation. When simulator evaluation is not required, process 100 proceeds directly from step 104 to the FV phase.

In process flowchart 100, FV is implemented via step 108. According to FAA requirements, FV must be carried out by an experienced flight validation pilot/evaluator approved in accordance with FAA Notice 8260.67. The objectives of FV include, among others, conducting an assessment of flyability to determine that the procedure can be safely flown; providing a final assurance that adequate obstacle clearance has been satisfied; and verifying that all navigation data to be published is accurate. Thus, FAA provides that FV must include an obstacle assessment (ground-based or airborne) phase followed by a flight evaluation phase. During the two phases, the FV crew must note any anomalies with regard to the flight procedure, flight management system (FMS) operation, obstructions, communications, surveillance, airport infrastructure, etc.

FAA requirements for PBN IFP validation are fully satisfied by steps 104 through 108 of process flowchart 100. Thus, procedure implementation may be directly proceeded to in step 112. Alternatively, embodiments of the present invention provide a post-flight validation phase in step 110, which may be performed after successful FV and prior to implementation. Post-flight validation includes various display, animation, analysis, and archiving features that aid instrument flight procedure developers.

Flight Validation

As described above, flight validation is a newly added FAA requirement of PNB IFP validation. Flight validation includes an obstacle assessment phase and a flight evaluation phase.

Figure 3:
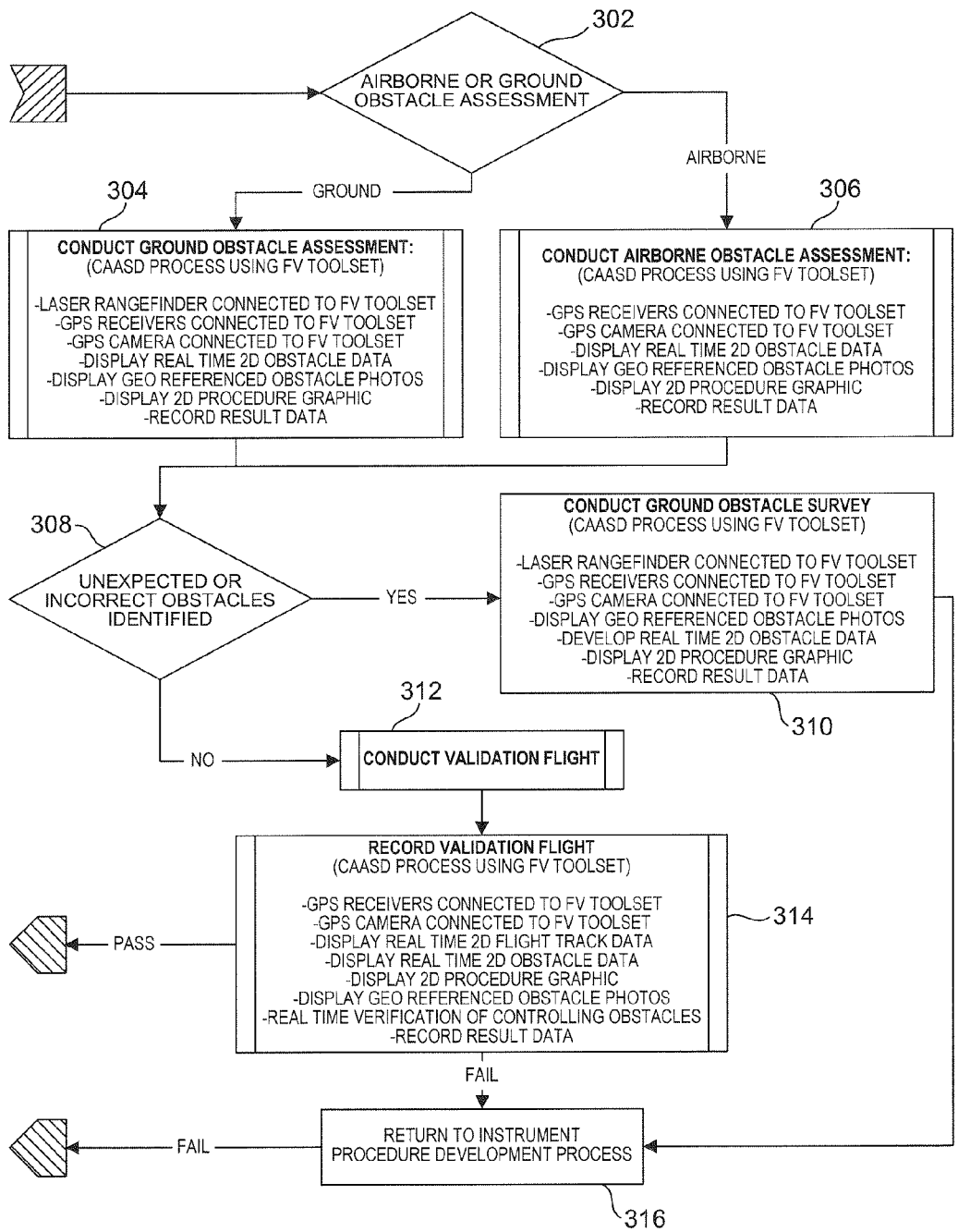
FIG. 3 illustrates an example flight validation process according to an embodiment of the present invention.

FIG. 3 illustrates an example flight validation process 300 according to an embodiment of the present invention. As shown in FIG. 3, example process 300 begins in step 302, which includes determining whether airborne or ground-based obstacle assessment is to be performed. This determination typically depends on the feasibility of performing either approach, and FAA requirements give instrument flight procedure developers the discretion of selecting either one of the two obstacle assessment approaches. Generally, however, ground-based obstacle assessment provides higher accuracy and is less expensive than airborne obstacle assessment, making it the preferred method of certified obstacle evaluators.

Depending on which obstacle assessment approach is selected, process 300 proceeds to either step 304 or step 306. In step 304, ground-based obstacle assessment is performed. Alternatively, in step 306, airborne obstacle assessment is performed. Embodiments of the present invention, as further described below, enable both ground-based and airborne obstacle assessment using a Flight Validation (FV) toolset. The FV toolset is comprised of hardware and/or software components, and can be readily used by a person of minimal skill and training (but sufficient to satisfy FAA requirements) to perform obstacle assessment as prescribed by FAA accuracy requirements. In an embodiment, the FV toolset includes a computer system having proprietary FV software installed thereon and one or more devices/modules (e.g., laser rangefinder, Global Positioning System (GPS) receiver, GPS camera, etc.) attached thereto or embedded therein. The peripheral devices can be used to make accurate position and height measurements of obstacles, as well as to capture and associate graphical information with the obstacles. The FV software uses the measurements made by the peripheral devices to perform obstacle assessment. In particular, the FV software compares the measurements against the obstacle information used in the procedure design phase. Typically, obstacle information used in procedure design is retrieved from various FAA databases available to procedure designers, however may be inaccurate. Thus, obstacle assessment is meant to verify the accuracy of obstacle information used in procedure design.

After obstacle assessment (either ground-based or airborne) is performed, process 300 proceeds to step 308, which includes determining whether unexpected obstacles or obstacles with inaccurate information (i.e., procedure design information) have been identified during obstacle assessment. If such obstacles have been identified, process 300 proceeds to step 310, which includes conducting a ground obstacle survey of the identified obstacles. Embodiments of the present invention enable ground obstacle surveying for the purposes of step 310, using the same FV toolset used for obstacle assessment. Thus, traditional survey methodologies which are both time consuming and expensive (because they require the services of professional certified surveyors) can be eliminated. Subsequently, process 300 proceeds to step 316, which includes returning to the instrument flight procedure development process to accommodate the new/corrected obstacle information.

If no obstacles requiring ground survey are identified during obstacle assessment, process 300 proceeds to step 312, which includes conducting a validation/evaluation flight of the instrument flight procedure. The validation/evaluation flight is a final on speed/on-path flight in a PBN capable aircraft, in order to evaluate the overall flyability of the instrument flight procedure. Embodiments of the present invention, as further described below, can also be used during the evaluation flight portion of FV to provide both an archiving functionality (e.g., video recording of the evaluation flight) and an oversight functionality to allow an oversight authority (e.g., FAA) to verify (offline or in real-time) that the evaluation flight is being performed according to the procedure.

If the validation/evaluation flight in step 314 is performed successfully, the FV phase of PNB IFP validation is complete and the instrument flight procedure is ready to be sent to the FAA for quality assurance checks. Otherwise, process 300 proceeds to step 316, which includes returning to the instrument flight procedure development process to address any issues identified during the validation/evaluation flight.

Obstacle Assessment and Surveying

As described above, FV includes an obstacle assessment phase (ground-based or airborne), and may include a ground obstacle surveying phase if new obstacles or inaccurate obstacle information is identified during obstacle assessment. While FV, and its associated obstacle assessment phase, is a recent FAA requirement, ground obstacle surveying is traditionally performed by specialized surveying companies in accordance with existing FAA regulations. The expense of such surveys hinders their feasibility for both the obstacle assessment and the ground obstacle survey phases of FV.

Embodiments of the present invention provide an alternative, low-cost approach for enabling the obstacle assessment and survey phases of FV. From one aspect, embodiments allow non-specialized personnel to conduct obstacle assessments with high levels of accuracy and repeatability, thereby eliminating the high costs associated with hiring specialized surveyors. From another aspect, embodiments leverage the capabilities of existing commercial off-the-shelf (COTS) hardware (e.g., GNSS receivers, laser rangefinders, cameras, etc.) to enable a low-cost FV toolset that can be of use in every phase of FV (i.e., obstacle assessment, ground obstacle surveying, validation/evaluation flight).

Figure 4:
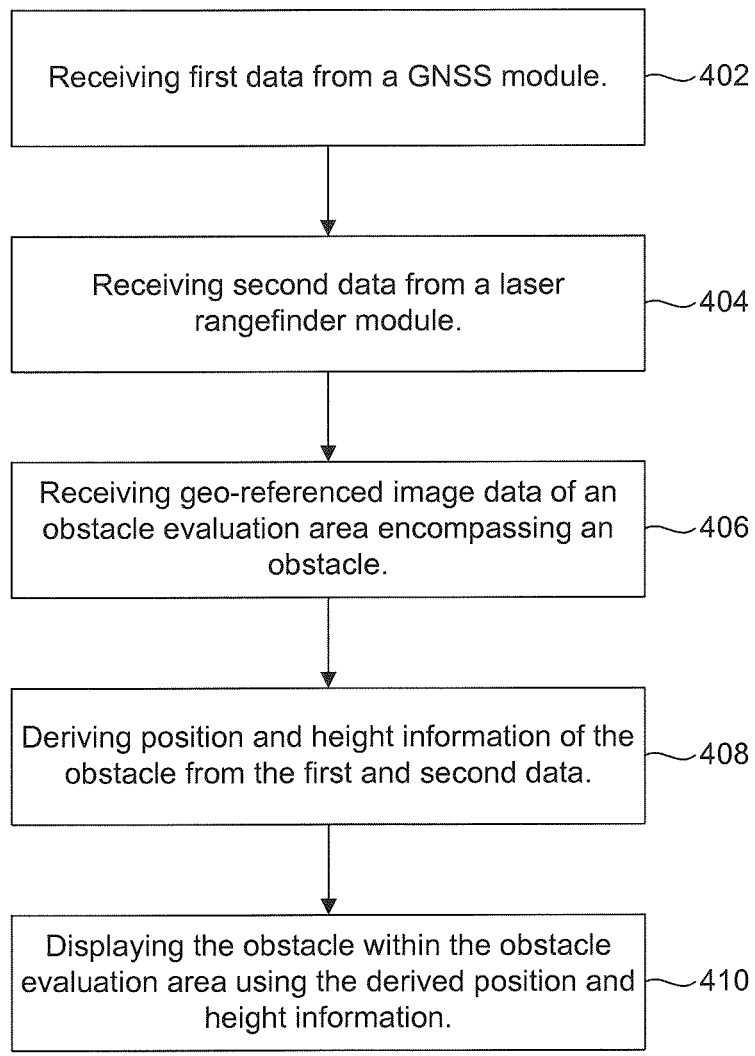
FIG. 4 illustrates an example process for obstacle assessment/surveying according to an embodiment of the present invention.

FIG. 4 illustrates an example process 400 for obstacle assessment/surveying according to an embodiment of the present invention. Process 400 may be performed using a FV toolset according to an embodiment of the present invention. In an embodiment, the FV toolset includes a computer system (e.g., laptop) having proprietary FV software installed thereon and one or more devices/modules (e.g., laser rangefinder, Global Positioning System (GPS) receiver, GPS camera, etc.) attached thereto or embedded therein. The FV software may include one or more interface modules to communicate with each of the one or more devices/modules.

As shown in FIG. 4, example process begins in step 402, which includes receiving first data from a GNSS (Global Navigation Satellite System) module. The first data may comprise a position measurement of an obstacle (when the obstacle is physically accessible and the obstacle's position can be measured directly) or of an anchor point (when the obstacle is physically inaccessible and the obstacle's position is measured relative to the anchor point). The GPS receiver may be a commercially available product (e.g., GlobalSat GNSS Wide Area Augmentation System (WAAS) Enabled Receiver, GlobalTop GNSS WAAS Enabled Receiver, Magellan Mobile Mapper GNSS WAAS Capable Receiver, etc.). In an embodiment, step 402 further includes receiving NMEA (National Marine Electronics Association) data. The NMEA data is used to establish a GNSS position, which can be displayed in a Graphical User Interface (GUI) of the FV toolset.

Step 404 includes receiving second data from a laser rangefinder module. The second data may comprise a height measurement of the obstacle or one or more distance measurements between an anchor point and the obstacle, a bearing measurement of the obstacle relative to the anchor point, and a height measurement of the obstacle (when the obstacle is physically inaccessible, and the obstacle's position and height are measured from the anchor point). The laser rangefinder may be a commercially available product (e.g., Laser Technology Incorporated TruPulse Laser Rangefinder) capable of precise measurements of distance, azimuth, and height of distant obstacles. Additional equipment (e.g., digital compass, tripod, etc.) may be used with the laser rangefinder to provide calibration and stable mounting of the laser rangefinder.

Step 406 includes receiving geo-referenced image data of an obstacle evaluation area encompassing the obstacle. In an embodiment, the geo-referenced data includes FAA AVNIS (Aviation Systems Standard Information System) aeronautical data as well as aerial photographs which can be obtained from various data sources. In another embodiment, the geo-referenced image data includes, alternatively or additionally, geo-referenced digital photographs captured by a camera module attached to the computer system.

As would be understood by a person skilled in the art based on the teachings herein, steps 402-406 may be performed in a different order than described herein or even simultaneously. Additionally, one or more of steps 402-406 may be omitted as determined by a user of the FV toolset.

Step 408 includes deriving position and height information of the obstacle from the first and second data. When the obstacle is physically accessible, the position and base elevation information are directly contained in the first and second data. When the obstacle is not physically accessible, the obstacle's position and height are derived from the laser rangefinder measurements made from the anchor point and the position measurements of the anchor point. In an embodiment, deriving the position and height information comprises computing a plurality of position and height measurements; and averaging the plurality of position and height measurements to generate the derived position and height information.

When the obstacle position and height information have been derived, the obstacle is displayed in step 410 in the GUI of the FV toolset. Additionally, any geo-referenced image data relating to the obstacle or to the obstacle evaluation area encompassing the obstacle can be displayed.

Figure 5:
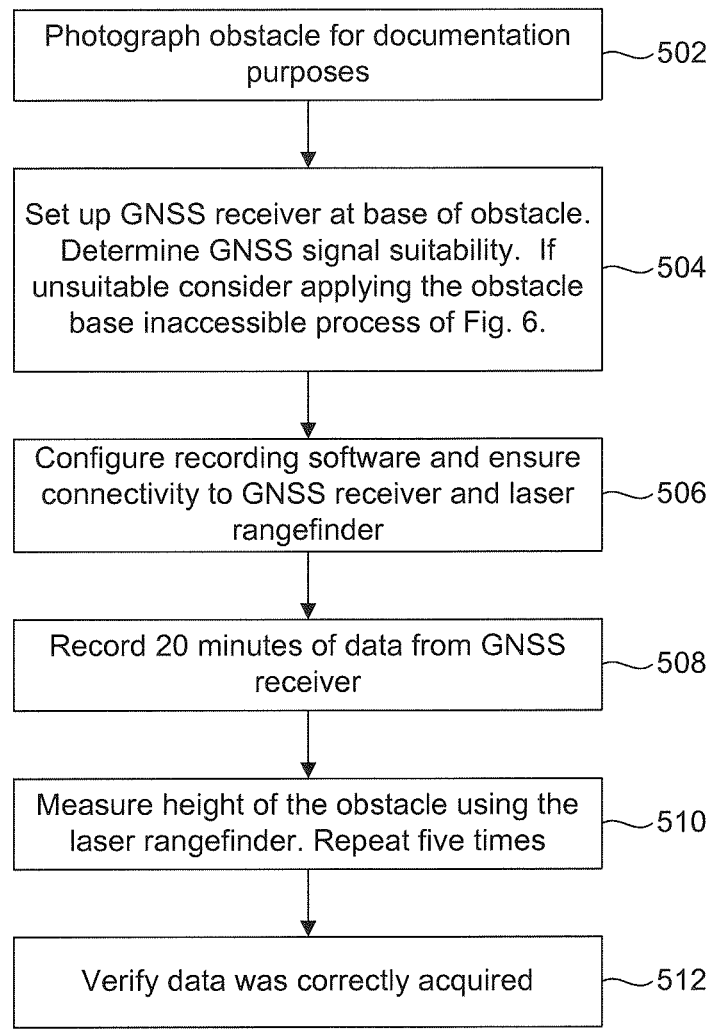
FIG. 5 illustrates an example process for measuring the position and height of an obstacle when the obstacle base is accessible according to an embodiment of the present invention.
Figure 6:
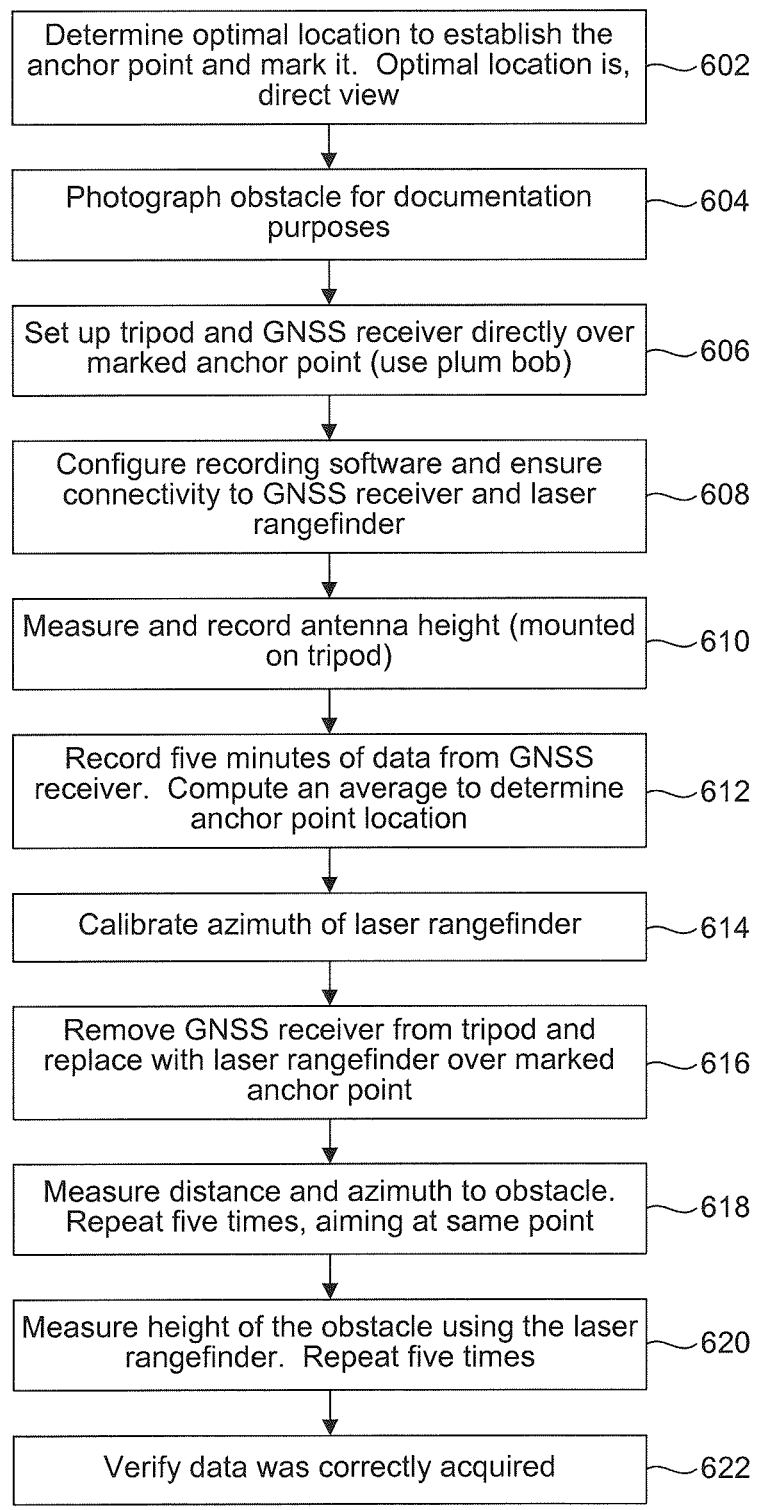
FIG. 6 illustrates an example process for measuring the position and height of an obstacle when the obstacle base is inaccessible according to an embodiment of the present invention.

As would be understood by a person skilled in the art based on the teachings herein, the accuracy of the derived position and height information of the obstacle depends not only on the maximum accuracy of the measuring devices/modules but also on the measurement procedures used by the user of the FV toolset, and will vary from survey to survey. Accordingly, embodiments of the present invention provide suggested measurement procedures for use with the FV toolset, which are described below with reference to FIGS. 5 and 6. As would be understood by a person skilled in the art, the measurement procedures provided in FIGS. 5 and 6 are provided for the purpose of illustration only and are not limiting of the scope of embodiments of the present invention. Other measurement procedures which may be apparent to a person of skill in the art based on the teachings herein are also within the scope of embodiments of the present invention.

FIG. 5 illustrates an example process 500 for measuring the position and height of an obstacle when the obstacle base is accessible according to an embodiment of the present invention. Example process 500 may be performed using the FV toolset according to an embodiment of the present invention.

As shown in FIG. 5, example process 500 begins in step 502, which includes photographing the obstacle for documentation purposes. In an embodiment, step 502 is performed using a camera attached to the computer system running the FV software.

In step 504, process 500 includes positioning a GNSS receiver of the FV toolset at the base of the obstacle, and determining the suitability of the GNSS signal at the position of the GNSS receiver. If the GNSS signal is unsuitable at the GNSS receiver position, the process of FIG. 6 designed for use when the obstacle base is inaccessible may be used instead of process 500. If the GNSS signal is suitable at the GNSS receiver position, process 500 proceeds to step 506.

In step 506, process 500 includes configuring a data recording software of the FV toolset and ensuring that the data recording software is connected to the GNSS receiver and a laser rangefinder module of the FV toolset.

In step 508, 20 minutes of data from the GNSS receiver are recorded. As would be understood by a person skilled in the art, more or less recording time may also be used.

Subsequently, in step 510, process 500 includes measuring the height of the obstacle using the laser rangefinder module. In an embodiment, the height measurement is repeated five times.

Finally, in step 512, process 500 includes verifying that obstacle position/height data was correctly acquired and recorded.

FIG. 6 illustrates an example process 600 for measuring the position and height of an obstacle when the obstacle base is inaccessible according to an embodiment of the present invention. Example process 600 may be performed using the FV toolset according to an embodiment of the present invention.

As shown in FIG. 6, example process 600 begins in step 602, which includes determining an optimal location to establish an anchor point and marking it. Typically, an optimal location is at a direct view of the obstacle, with minimal clutter of objects that could obstruct a distance measurement.

In step 604, process 600 includes photographing the obstacle for documentation purposes. Then, in step 606, a GNSS receiver of the FV toolset is positioned (preferably on top of a tripod) over the marked anchor point.

In step 608, process 600 includes configuring a data recording software of the FV toolset and ensuring that the data recording software is connected to the GNSS receiver and a laser rangefinder module of the FV toolset.

In step 610, process 600 includes measuring and recording the GNSS receiver antenna height.

Subsequently, in step 612, process 600 includes recording five minutes of data from the GNSS receiver, and computing an average from the recorded GNSS data to determine the location of the anchor point.

Subsequently, step 616, includes removing the GNSS receiver from the tripod and replacing it with the laser rangefinder, while continuing to position the tripod over the anchor point. Then, in step 618, the distance to the obstacle is measured using the laser rangefinder. In an embodiment, the measurements are repeated at least five times, aiming at the same point.

Finally, in step 620, the height of the obstacle is measured using the laser rangefinder. In an embodiment, the height measurement is repeated at least five times. Process 600 terminates in step 622, which includes verifying that the data was correctly acquired and recorded.

Figure 8:
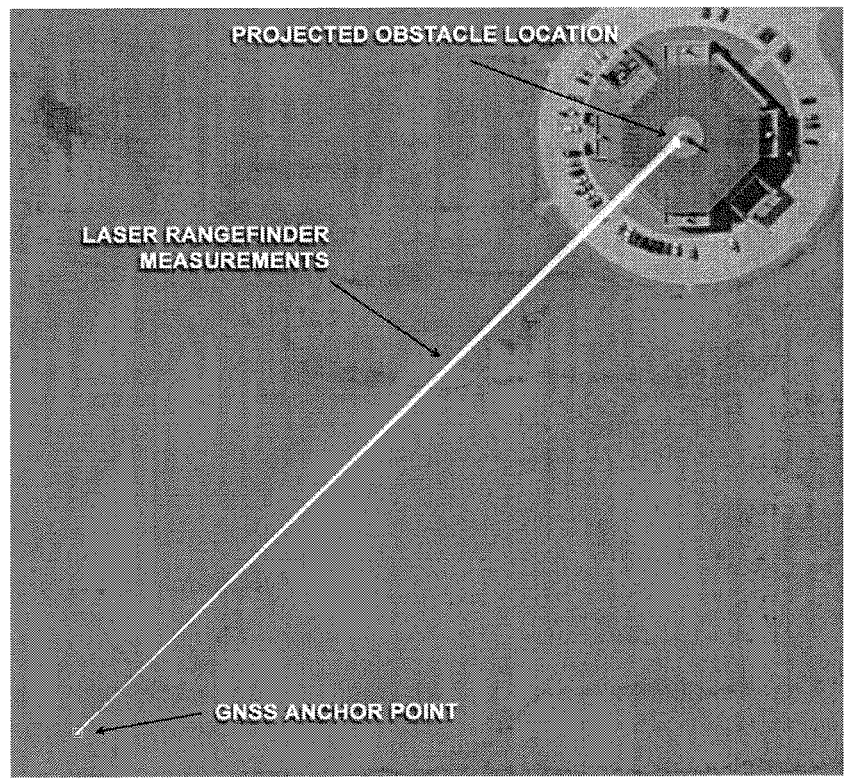
FIGS. 8-10 illustrate example features of an embodiment of the present invention.
Figure 9:
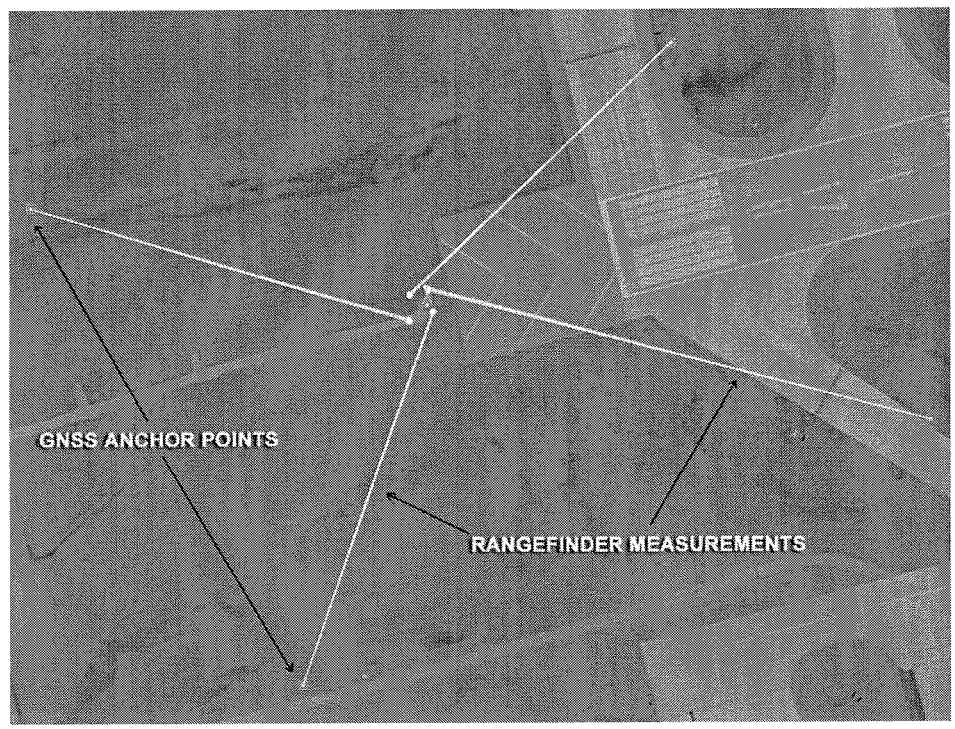
Figure 10:
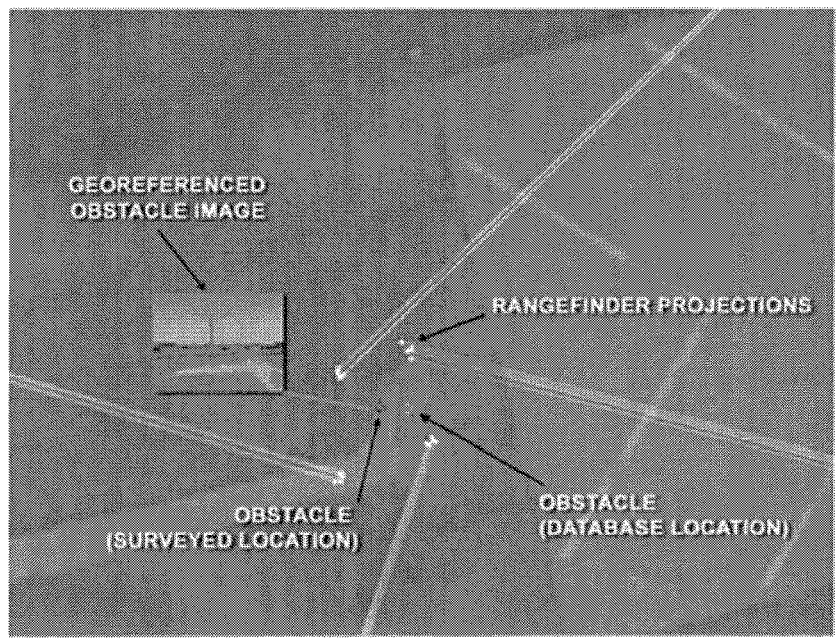

According to embodiments of the present invention, measurements and/or data made/captured using the above described processes 400-600 can be illustrated graphically using a GUI of the FV toolset. FIGS. 8-10, further described below, show a few graphical illustration features of embodiments of the present invention. These features are presented for the purpose of illustration and not limitation.

FIG. 8 shows an example GUI illustration of an obstacle assessment/survey performed according to process 600 described above. As shown in FIG. 8, the GUI illustration shows the GNSS established anchor point from which the obstacle position/height were measured, the actual measurements made using a laser rangefinder, and the projected obstacle location, all geo-referenced to an actual aerial photograph of the area encompassing the obstacle.

FIG. 9 shows another example GUI illustration of an obstacle assessment/survey performed according to an embodiment of the present invention. In particular, FIG. 9 illustrates the use of multiple anchor points around an obstacle to perform obstacle assessment/surveying. Measurements are made from each of the anchor points according to process 600 in order to obtain a full and unobstructed assessment of the entire obstacle. In an embodiment, the measurements made by the multiple anchor points are integrated into an improved measurement through the use of trilateration over the surface of the WGS84 ellipsoid. Higher accuracy may be achieved by using multiple anchor points and the accuracy is subject to the location of these anchor points.

FIG. 10 is an example zoomed view of the GUI illustration of FIG. 9. FIG. 10 illustrates additional features of embodiments of the present invention. For example, FIG. 10 shows that database obstacle information (which is used in procedure design and is typically imported from public databases) can be graphically displayed along with obstacle location measurements made from multiple anchor points and the surveyed obstacle information (which may be an average of the obstacle location measurements). Thus, discrepancies in database obstacle information can be readily determined by visual inspection, significantly simplifying performance of step 308 of FV process 300. Additionally, geo-referenced image data of the obstacle can be associated with the surveyed obstacle to provide further verification of the obstacle information.

Figure 7:
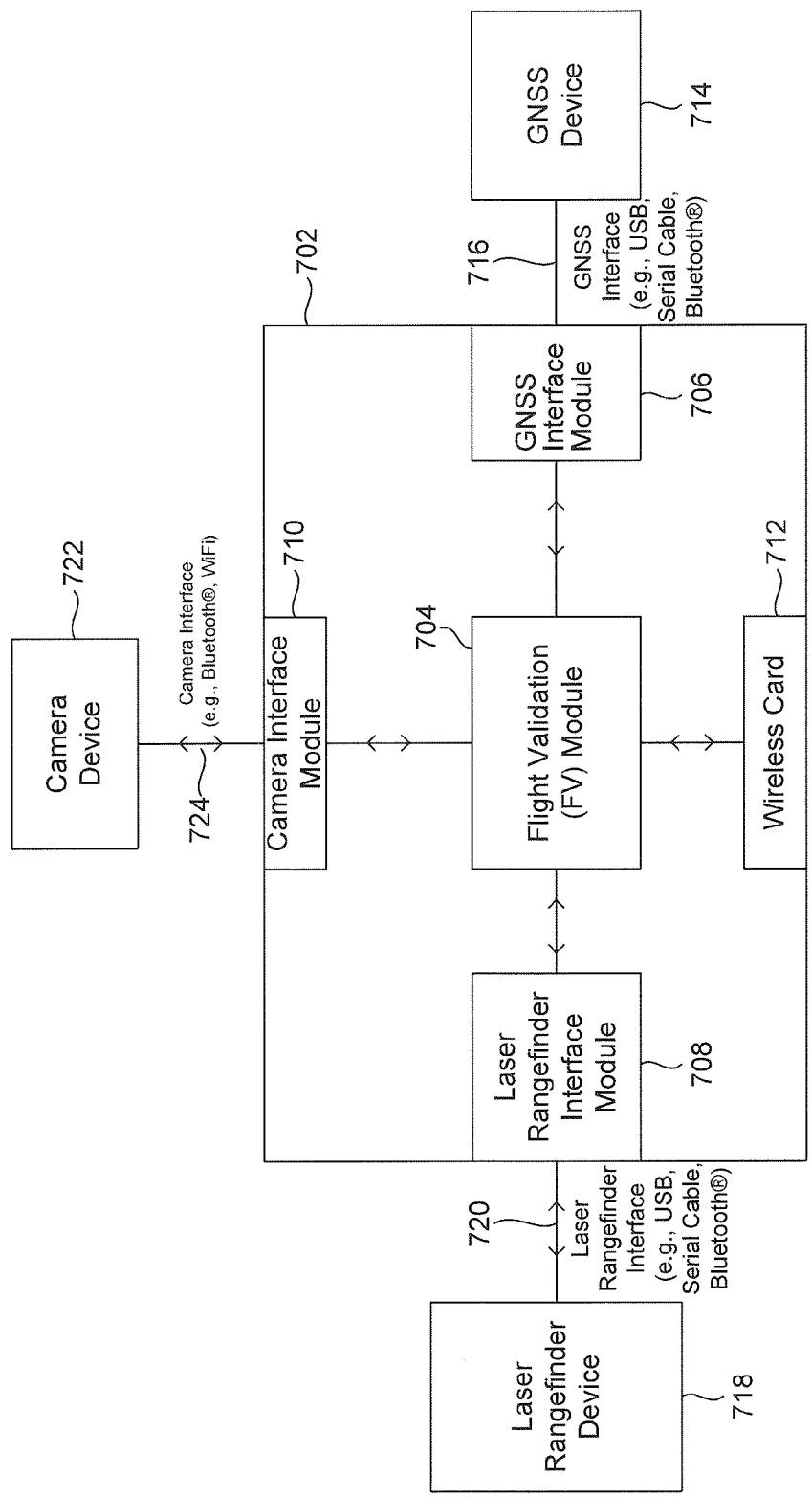
FIG. 7 is an example system according to an embodiment of the present invention.

FIG. 7 is an example system 700 operable to implement processes 400-600 according to an embodiment of the present invention. In an embodiment, system 700 may include a FV toolset as described above. As would be understood by a person skilled in the art based on the teachings herein, example system 700 represents only one approach for implementing embodiments of the present invention. System 700 is thus provided for the purpose of illustration and not limitation.

As shown in FIG. 7, example system 700 includes a FV toolset having a main module 702 (which may be laptop computer system, for example) and a plurality of external devices (i.e., GNSS device 714, laser rangefinder device 718, camera device 722) attached to main module 702.

Main module 702 includes a FV module 704 and a plurality of interface modules for interfacing with the external devices of the FV toolset. In particular, module 702 includes a GNSS interface module 706 that interfaces via a GNSS interface 716 with GNSS device 716; a laser rangefinder interface module 708 that interfaces via a laser rangefinder interface 720 with laser rangefinder device 718; and a camera interface module 710 that interfaces via a camera interface 724 with camera device 722.

In an embodiment, FV module 702 is integrated within the TARGETS software tool, developed by the MITRE corporation. Alternatively, FV module 702 is a standalone software tool. FV module 702 may include or interfaces with one or more software modules/applications, with the ability to display and post-process GNSS data received from the GNSS data, process NMEA data sentences and provide average GNSS position information, process and display laser rangefinder data, and process and display geo-referenced image data and aerial photographs.

Main module 702 also includes a wireless card 712 to allow FV module 702 to broadcast and receive data wirelessly. For example, wireless card 712 is used to enable real-time broadcasting of flight recording data and/or to import obstacle information (used in procedure design) from a database.

Flight Evaluation/Validation

Embodiments of the present invention also support the evaluation/validation flight portion of FV. In particular, embodiments can be used during the evaluation/validation flight to record the flight (i.e., actual flight track, altitudes, and speeds) both to create an electronic record of the flight and to verify that controlling obstacles by segment were evaluated. Accordingly, embodiments may include an autonomous GPS recording system (AGRS) within the FV toolset for recording the flight. Additionally, embodiments may include the capability to broadcast in real-time the flight recording to be played in real-time using a compatible tool, such as TARGETS, for example. Thus, embodiments enable an oversight function, whereby an oversight authority (e.g., FAA) can verify in real-time that the evaluation/validation flight is being performed according to design and can determine whether or not the evaluation/validation flight is successful.

Example Computer System Implementation

Figure 11:
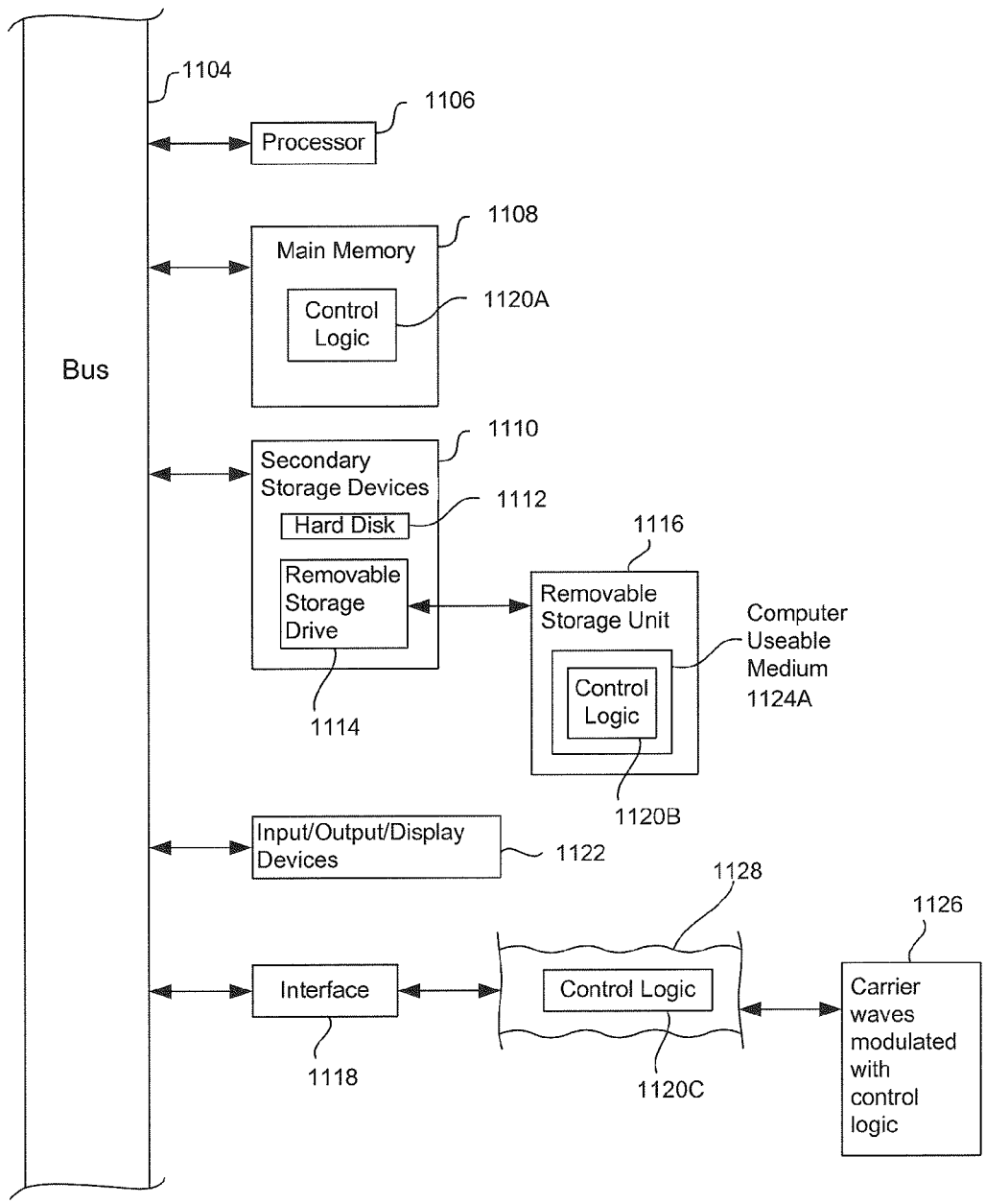
FIG. 11 is an example computer system capable of implementing embodiments of the present invention.

Various aspects of the present invention can be implemented by software, firmware, hardware, or a combination thereof. FIG. 11 illustrates an example computer system 1102 in which embodiments of the present invention, or portions thereof, can be implemented as computer-readable code. For example, the methods illustrated by process flowcharts 400-600 can be implemented in system 1102. Various embodiments of the invention are described in terms of this example computer system 1102. After reading this description, it will become apparent to a person skilled in the relevant art how to implement the invention using other computer systems and/or computer architectures.

Computer system 1102 includes one or more processors, such as processor 1106. Processor 1106 can be a special purpose or a general purpose processor. Processor 1106 is connected to a communication infrastructure 804 (for example, a bus or network).

Computer system 1102 also includes a main memory 1108, preferably random access memory (RAM), and may also include a secondary memory 1110. Secondary memory 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like. Removable storage drive 1114 reads from and/or writes to a removable storage unit 1116 in a well known manner. Removable storage unit 1116 may comprise a floppy disk, magnetic tape, optical disk, etc. which is read by and written to by removable storage drive 1114. As will be appreciated by persons skilled in the relevant art(s), removable storage unit 1116 includes a computer usable storage medium 1124 having stored therein computer software and/or logic 1120B.

Computer system 1102 may also include a communications interface 1118. Communications interface 1128 allows software and data to be transferred between computer system 1102 and external devices. Communications interface 1118 may include a modem, a network interface (such as an Ethernet card), a communications port, a PCMCIA slot and card, or the like. Software and data transferred via communications interface 1118 are in the form of signals which may be electronic, electromagnetic, optical, or other signals capable of being received by communications interface 1118. These signals are provided to communications interface 1118 via a communications path 1128. Communications path 1128 carries signals and may be implemented using wire or cable, fiber optics, a phone line, a cellular phone link, an RF link or other communications channels.

In this document, the terms "computer program medium" and "computer usable medium" and "computer readable medium" are used to generally refer to media such as removable storage unit 1116 and a hard disk installed in hard disk drive 1112. Signals carried over communications path 1128 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1102.

Computer programs (also called computer control logic) are stored in main memory 1108 and/or secondary memory 1110. Computer programs may also be received via communications interface 1118. Such computer programs, when executed, enable computer system 1102 to implement the present invention as discussed herein. In particular, the computer programs, when executed, enable processor 1106 to implement the processes of the present invention. Accordingly, such computer programs represent controllers of the computer system 1102. Where the invention is implemented using software, the software may be stored in a computer program product and loaded into computer system 1102 using removable storage drive 1114, interface 1118, hard drive 1112 or communications interface 1128.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for assessing an obstacle, comprising:
   receiving first data from a Global Navigation Satellite System (GNSS) module;
   determining second data, wherein determining the second data comprises performing using a laser rangefinder module a plurality of distance measurements from a plurality of anchor points to the obstacle and a direct height measurement of the obstacle;
   receiving geo-referenced image data of an obstacle evaluation area encompassing the obstacle;
   determining position and height information of the obstacle from the first and second data; and
   displaying the obstacle within the obstacle evaluation area using the geo-referenced image data and the determined position and height information.

2. The method of claim 1, wherein receiving the first data comprises receiving National Marine Electronics Association (NMEA) data or position data generated by a GNSS receiver.

3. The method of claim 1, wherein receiving the first data comprises receiving a position measurement of the obstacle.

4. The method of claim 1, wherein receiving the first data comprises receiving a position measurement of at least one of the plurality of anchor points.

5. The method of claim 1, wherein the GNSS module comprises a GNSS receiver.

6. The method of claim 1, wherein determining the second data further comprises determining a height of at least one of the plurality of anchor points.

7. The method of claim 1, wherein receiving the geo-referenced image data comprises receiving the geo-referenced image data from a camera.

8. The method of claim 1, wherein receiving the geo-referenced data comprises one or more of:
   receiving geo-referenced aeronautical data from a database; and
   receiving geo-referenced digital photographs captured by a camera module.

9. A method for assessing an obstacle, comprising:
   receiving first data from a Global Navigation Satellite System (GNSS) module;
   receiving second data from a laser rangefinder module, where receiving said second data comprises performing from a plurality of anchor points, using the laser rangefinder module, respective distance measurements to the obstacle and obstacle height measurements;
   receiving geo-referenced image data of an obstacle evaluation area encompassing the obstacle; and
   determining position and height information of the Obstacle from the first and second data, wherein said determining comprises:
      integrating the distance measurements through the use of trilateration on a World Geodetic System (WGS) 84 (WGS84) ellipsoid to generate the position information of the obstacle; and
      averaging the obstacle height measurements to generate the height information of the obstacle.

10. A computer program product comprising a tangible computer useable medium including control logic stored therein, the control logic when executed by one or more processors enabling obstacle assessment according to a method, the method comprising:
   receiving first data from a Global Navigation Satellite System (GNSS) module;
   determining second data, wherein determining the second data comprises performing using a laser rangefinder module a plurality of distance measurements from a plurality of anchor points to an obstacle and a direct height measurement of the obstacle;
   receiving geo-referenced image data of an obstacle evaluation area encompassing the obstacle;
   determining position and height information of the obstacle from the first and second data; and
   displaying the obstacle within the obstacle evaluation area using the geo-reference image data and the determined position and height information.

11. The computer program product of claim 10, wherein receiving the first data comprises receiving National Marine Electronics Association (NMEA) or position data generated by a GNSS receiver.

12. The computer program product of claim 10, wherein receiving the first data comprises receiving a position measurement of the obstacle.

13. The computer program product of claim 10, wherein receiving the first data comprises receiving a position measurement of at least one of the plurality of anchor points.

14. The computer program product of claim 10, wherein the GNSS module comprises a GNSS receiver.

15. The computer program product of claim 10, wherein determining the second data further comprises determining a height of at least one of the plurality of anchor points.

16. The computer program product of claim 10, wherein receiving the geo-referenced image data comprises receiving the geo-referenced image data from a camera.

17. The computer program product of claim 10, wherein receiving the geo-referenced image data comprises one or more of:
   receiving geo-referenced aeronautical data from a database; and
   receiving geo-referenced digital photographs captured by a camera module.

18. A system, comprising:
   a Global Navigation Satellite System (GNSS) device configured to generate first data;
   a laser rangefinder device configured to generate second data, wherein the second data comprises a plurality of distance measurements from a plurality of anchor points to an obstacle and a direct height measurement of the obstacle; and
   a flight validation (FV) module configured to receive the first data from the GNSS device and the second data from the laser rangefinder device, and to determine position and height information of the obstacle from the first and second data.

19. The system of claim 18, further comprising:
   a camera, wherein the FV module receives from the camera geo-referenced image data of an obstacle evaluation area encompassing the obstacle.

20. The system of claim 19, wherein the FV module comprises:
   a display module that displays the obstacle within the obstacle evaluation area using the determined position and height information.

21. The system of claim 19, further comprising:
   a GNSS interface module that interfaces the FV module and the GNSS device;

a laser rangefinder interface module that interfaces the FV module and the laser rangefinder device; and
a camera interface module that interfaces the FV module and the camera.

22. The system of claim 18, wherein the first data comprises a position measurement of the obstacle.

23. The system of claim 18, wherein the first data comprises a position measurement of the anchor point.

24. The system of claim 18, wherein the GNSS device comprises a GNSS receiver.

25. The system of claim 18, wherein the second data further comprises a height measurement of the anchor point.

26. The system of claim 18, wherein the FV module is further configured to received geo-referenced image data of an obstacle evaluation area encompassing the obstacle from a database and to display the obstacle within the obstacle evaluation area using the geo-referenced image data and the determined position and height information.

27. The system of claim 18, further comprising:
a wireless card, wherein the FY module receives using the wireless card one or more of obstacle information and geo-referenced aeronautical data from a database.

\* \* \* \* \*